US006017075A

United States Patent [19]

Emery et al.

[11] Patent Number: 6,017,075

[45] Date of Patent: Jan. 25, 2000

[54] BEDLINER WITH DEPTH VARIANT RIBS FOR LOAD PLACEMENT

[75] Inventors: Phillip L. Emery, Portage; Timothy E. Williams, Sun Prairie; Kristin A. Uttech, DeForest, all of Wis.

[73] Assignee: Penda Corporation, Portage, Wis.

[21] Appl. No.: 09/287,049

[22] Filed: Apr. 6, 1999

[51] Int. Cl.[7] .................... B60R 13/01

[52] U.S. Cl. .................... 296/39.1; 410/90; 296/39.2

[58] Field of Search .................... 296/39.1, 39.2; 410/90, 91

[56] References Cited

U.S. PATENT DOCUMENTS

| | | |
|---|---|---|
| D. 271,009 | 10/1983 | Fishler . |
| 4,181,349 | 1/1980 | Nix et al. . |
| 4,188,058 | 2/1980 | Resa et al. . |
| 4,911,493 | 3/1990 | Muirhead . |
| 5,131,709 | 7/1992 | Spica . |
| 5,137,322 | 8/1992 | Muirhead . |
| 5,154,478 | 10/1992 | Erickson et al. . |
| 5,421,634 | 6/1995 | Hackett . |
| 5,722,711 | 3/1998 | German . |

OTHER PUBLICATIONS

Exhibit A—Photograph of front section of Durakon All Star bedliner, bedliner dated prior to Aug. 18, 1997.

*Primary Examiner*—Dennis H. Pedder
*Assistant Examiner*—Mickki D. Murray
*Attorney, Agent, or Firm*—Lathrop & Clark LLP

[57] ABSTRACT

A thermoformed thermoplastic truck bedliner has a bottom wall with parallel front-to-back ribs which overlies the floor of a truck cargo bed. Two side walls extend upwardly on opposite sides of the bottom wall and are joined at a front wall. Ribs of a normal height define the load support surface of the bedliner bottom wall, while regions of parallel ribs which are lower in height than the normal ribs define cargo containment regions. The intersection of the reduced height ribs with the normal height ribs defines ridges which restrain escape of cargo in the front-to-back direction, while the bedliner side walls and elevated height protrusions on normal height ribs adjacent to the cargo containment regions restrain side-to-side displacement of the cargo.

16 Claims, 4 Drawing Sheets

36 22 20 50 50 52 66 54 52 34 40 70 46 54 32 44 68 28 48 42 100 37 38

BEDLINER WITH DEPTH VARIANT RIBS FOR LOAD PLACEMENT

CROSS-REFERENCES TO RELATED APPLICATIONS

STATEMENT AS TO RIGHTS TO INVENTIONS MADE UNDER FEDERALLY SPONSORED RESEARCH AND DEVELOPMENT

BACKGROUND OF THE INVENTION

The present invention relates generally truck bedliners and particularly to thermoformed thermoplastic bedliners having structure which engages with cargo items for load restraint.

Although long used in agricultural and commercial applications, pick-up trucks with open cargo beds have also become increasingly popular as personal and family vehicles. The commercial vehicle owner, although concerned with performance and cost effectiveness of the vehicle, often considers the vehicle as a traveling company advertisement or symbol. A neat and well-maintained vehicle is more likely to favorably impress customers. Owners of personal vehicles, while concerned with functionality and efficiency, are also concerned with pride of ownership, personal image, and outward appearances. In addition, the automotive enthusiast desires to maintain his vehicle in as close to a"like new" condition as possible.

Truck bedliners of plastic or rubber are commonly employed to protect the painted metal surfaces of a pick-up truck cargo bed. These truck bedliners are available in a wide variety of configurations to suit the wide variety of available trucks. Bedliners protect the cargo bed from scratching and denting as well as paint fading from exposure to sunlight and elements. One-piece thermoformed thermoplastic truck bedliners provide a cost-effective means of protecting the truck cargo bed.

During acceleration and cornering, however, cargo may slide out of position in the truck bed, sometimes colliding with other cargo or the bed wall. Both the cargo and the bedliner may suffer damage due to collisions.

By thermoforming bedliners of materials with a high coefficient of friction, or by applying high coefficient of friction coatings to the formed bedliner, cargo slippage within the bedliner can generally be reduced. Nevertheless, there is a limit to the forces that can be resisted by friction alone within a truck bed.

Several devices have been devised to restrain cargo within the bed while retaining the easy loading feature of a low-friction bed surface. Some bedliners are adapted to receive segments of high coefficient of friction material to provide grip zones on the bed floor. By engaging high friction segments to low friction floor ribs, these bedliners create a grip zone above the low-friction bed surface. When cargo is loaded onto the grip zone region, the cargo can withstand greater accelerations without sliding out of position in the bed.

Other bedliners have sidewall pockets or ribs which are adapted to receive load restraint members which extend longitudinally or transversely across the bed. The members essentially divide the bed into smaller compartments within which the cargo is restrained. The movement of slipping cargo is stopped by the presence of the restraint member.

Another method of reducing slippage is to install storage compartments into the truck bed. Although storage compartments effectively reduce slippage, they also reduce the amount of truck bed area available for placement of large cargo items.

What is needed is a bedliner which provides a reliable cargo restraint during transit, while still permitting relatively unimpeded utilization of the full cargo area.

SUMMARY OF THE INVENTION

The truck bedliner of this invention has floor ribs of varying heights configured to receive and retain cargo in the bed. A plurality of normal height ribs define a cargo loading region. Groups of a plurality of reduced height ribs define one or more cargo containment regions within the bed. Due to the varying heights of the ribs, the intersections of reduced height ribs and normal height ribs define a ridge. When acceleration forces bias the cargo toward the cargo loading region, the cargo abuts against the ridge, restraining the cargo from sliding out of the cargo containment region. A protrusion above the height of the normal ribs may be provided on a rib which extends parallel to the cargo containment region, to restrict sideward exit of the cargo.

It is an object of this invention to provide a bedliner that both facilitates easy loading and reduces cargo sliding during acceleration.

It is a further object of this invention to provide a unitary bedliner with cargo containment regions for separation of cargo during transit.

It is another object of this invention to provide a bedliner that reduces the occurrence of cargo collisions during vehicle acceleration and cornering.

Further objects, features and advantages of the invention will be apparent from the following detailed description when taken in conjunction with the accompanying drawings.

DESCRIPTION OF THE PREFERRED EMBODIMENTS

Figure 1:
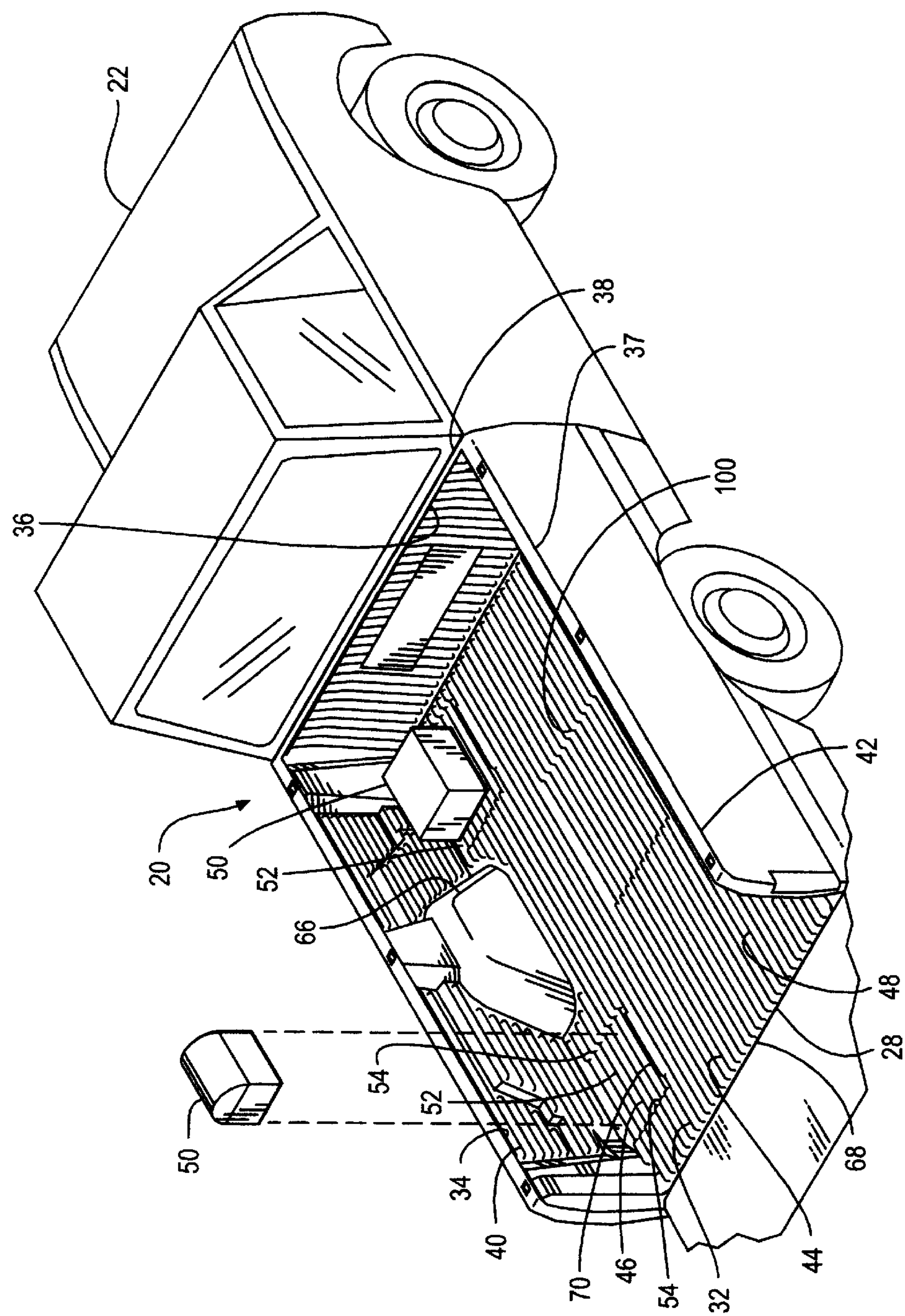
FIG. 1 is an isometric view of the bedliner of this invention installed in a pickup truck bed with an element of cargo shown in exploded relation to the bedliner.

Referring more particularly to FIGS. 1–4, wherein like numbers refer to similar parts, a bedliner 20 is shown in relation to the bed of a conventional pickup truck 22 in FIG. 1. The bedliner 20 is formed from thermoplastic material such as high density polyethylene through the single sheet thermoforming process. In this process a planar sheet of extruded thermoplastic material, for example about ¼ inch thick, which may be preformed with a pattern on one surface, is heated and then positioned over a vacuum thermoforming mold. A vacuum is drawn on the mold to bring the semi-molten plastic into contact with the mold where it is formed to a desired shape. After the part has at least partly cooled it is removed from the mold and trimmed to its final configuration and any through holes are formed in the part through drilling or routing.

As shown in FIG. 1, the bedliner 20 has a bottom wall 28 which overlies and covers the truck cargo bed floor. The bedliner bottom wall 28 extends generally in a horizontal plane, and it has a series of inverted U-shaped longitudinal ribs 32 which contribute to the rigidity of the bottom wall, enhance drainage, and provide a receptacle for water beneath a support surface defined by the tops the ribs. Although the bedliner 20 has been illustrated as an under-the-rail bedliner, it should be understood that an over-the-rail liner including the features of this invention may also be formed.

Two side walls 34 extend upwardly from the bedliner bottom wall 28 and may be inclined outwardly somewhat for improved nesting. The side walls 34 are joined at the front of the bedliner by a liner front wall 36 which extends upwardly from the bedliner bottom wall 28 to cover the truck bed front wall 38. The bedliner side walls are positioned on the interior sides of the truck cargo bed side walls 37 and serve to shield and protect the side walls from soiling and damage. Each bedliner side wall 34 has an upper margin 40 which engages against a truck cargo bed side wall 37 beneath a truck bed side rail 42. The side walls 37 may be provided with board holder pockets for restraining larger cargoes.

The bedliner bottom wall has inverted generally U-shaped longitudinal ribs 32 of two heights: normal height ribs 44 which generally define the floor of the bedliner, and reduced height ribs 46 which define selected cargo containment regions. These depth variant ribs interact to provide a barrier to cargo movement. The depth of the reduced height ribs is preferably approximately one-half the depth of the normal height ribs. For example, the reduced height ribs may be approximately one quarter inch high, while the normal height ribs may be approximately one-half inch high.

A plurality of parallel, regularly spaced normal height ribs 44 and reduced height ribs 46 divide the bottom wall into two regions. A first region 48 extending across the normal height ribs is typically used for loading and sliding cargo such as a toolbox or container 50 in the bedliner. One or more cargo containment regions 52, composed of adjacent reduced height ribs 46, is used for cargo containment during transit. The reduced height ribs 46 are formed continuously and in alignment with the normal height ribs 44, and are indicated in the top view of FIG. 2 in dotted lines. Hence the bottom wall of the bedliner 20, as in a conventional bedliner, has an array of parallel ribs which does not interfere with fluid drainage. Furthermore, the reduced height ribs 46 still contribute to the stiffness of the bedliner bottom wall, helping the bottom wall to lay flat upon the truck bed.

Figure 2:
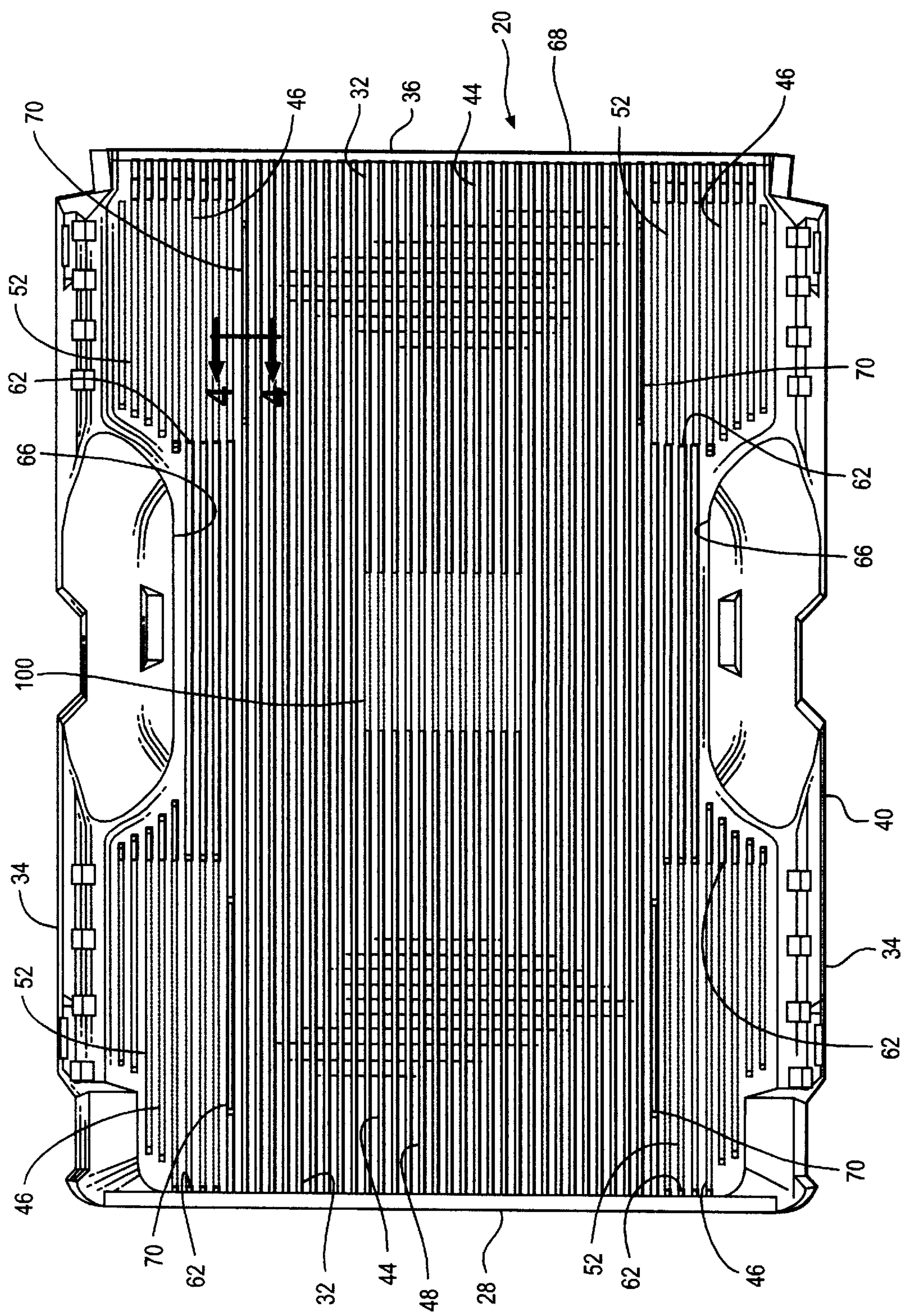
FIG. 2 is a top view of the bedliner FIG. 1.
Figure 3:
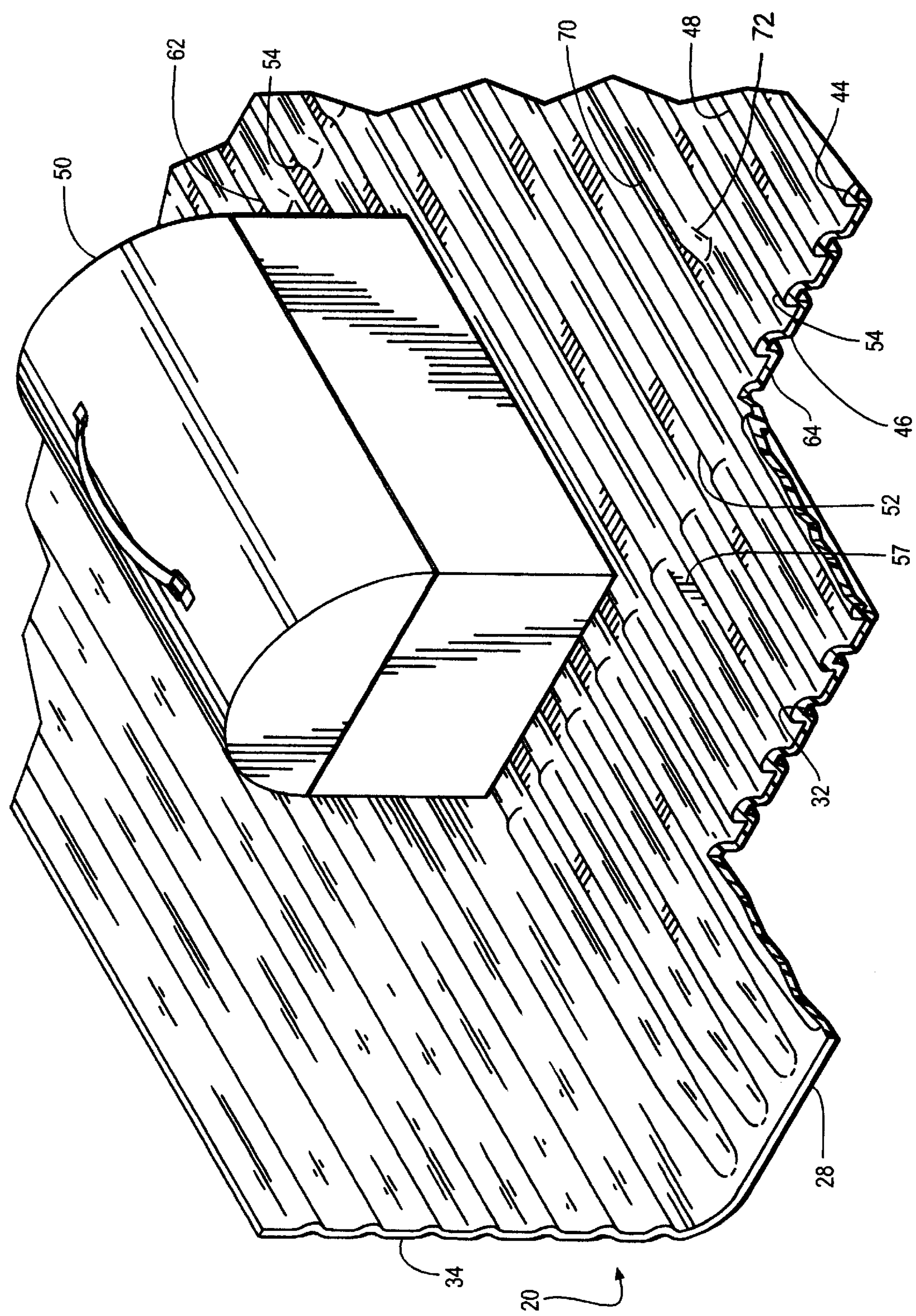
FIG. 3 is an isometric view, partly cut-away, of the bedliner of this invention.
Figure 4:
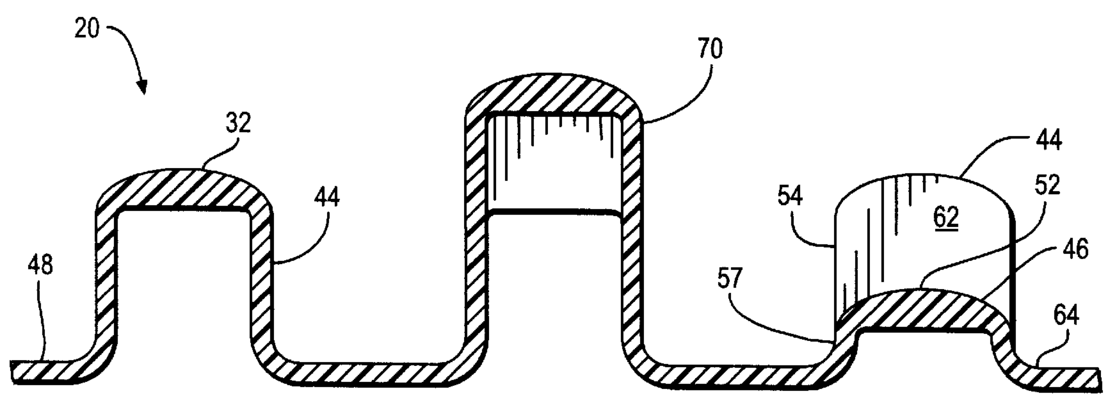
FIG. 4 is a fragmentary cross-sectional view of the bedliner of FIG. 2 taken along section line 4—4.

The normal height ribs 44 transition to the reduced height ribs at rounded, steeply pitched steps or end portions 62, shown in FIG. 3. The array of transition steps 62 define a ridge 54 which may be perpendicular to the individual ribs, and will generally extend side-to-side within the bedliner. The height of the ridge 54 is the difference between the normal rib height and the reduced rib height. Each transition or step 62 has a side 57 which extends continuously along a normal height rib and a reduced height rib. The ridge 54, however, being formed by a plurality of steps 62 on a number of adjacent ribs is discontinuous. As shown in FIG. 2, a ridge 54 is defined forward of and rearward of each cargo containment region 52. In other words, a single rib, running from front to back of the bedliner, is first of a normal height, then decreases at a step 62 to a reduced height, and then increases at a second step 62 to the normal height again.

The ridges 54 provide a barrier to cargo movement beyond the cargo containment region 52. When vehicle acceleration forces cause the cargo 50 to slip across the bed, the cargo will abut against the ridge 54 and the cargo slippage will be restrained. Since the cargo slippage will be limited to the cargo containment region, the cargo velocities attained relative to the truck bed will be low, and any impact will be less likely to cause damage to the truck bed or cargo. It should be noted that it is not necessary that the container 50 match precisely the dimensions of the cargo containment region 52, but merely that it not be larger than the cargo containment region.

While the ridge prevents cargo from sliding about the truck bed, ease of loading is not sacrificed by the bedliner of this invention. Cargo may be set onto the bedliner and then slid into place. To place the cargo in the cargo containment region 52, the cargo may be slid across the bedliner and over the ridge until it drops into place in the cargo containment region 52.

Side to side restraint of cargo within the cargo containment regions 52 is provided by two structures: the bedliner side walls 34 and elevated height protrusions 70 provided on the normal height ribs 44 which extend adjacent to a cargo containment region 52. The elevated height protrusions 70 may extend above the normal height ribs the same distance as the normal height ribs extend above the reduced height ribs. For example, where the normal height ribs 44 have a height of one-half inch, the elevated height protrusion 70 may have a height of three-quarters of an inch. As shown in FIG. 2, the cargo containment regions are located adjacent to a bedliner side wall 34, and are preferably provided forward and rearward of a wheel well cover portion 66 of the bedliner. The cargo containment region 52 may extend from the wheel well portion 66 frontwardly toward the bedliner front wall 36 or rearwardly toward the bedliner rear edge 68. The bedliner side wall 34, which extends upwardly to a height much greater than the reduced height ribs, blocks outward travel of the cargo within a cargo containment region 62. The elevated height protrusions 70, shown as darkened ribs in FIG. 2, are provided on only a single normal height rib extending alongside a cargo containment region. One elevated height protrusion 70 may be provided on the inside edge of each cargo retainment region 52. Because the articles contained within the cargo containment regions will usually fill a substantial fraction of the cargo containment region 52, the elevated height protrusions 70 need not extend along the entire length of the cargo containment region. Furthermore, as shown in FIG. 3, the elevated height protrusion may have an approximately 45 degree ramp 72 on both the front end and the rear end, to prevent the elevated height protrusion from being an obstacle when loading timbers, plywood, or other objects into the bed. Hence, material entering from the normal height ribs will not abut or hang up on the elevated height protrusion.

It will be noted that the cargo containment regions preserve most of the advantages of a ribbed bedliner floor. The reduced height ribs still contribute to the floor rigidity, and, although the water capacity between ribs may be somewhat reduced by the reduced rib height, the channels 64 between the ribs contribute to effective water drainage and provide a receptacle for water beneath the support surface on top of the ribs.

The cargo containment region may be designed to accommodate cargo of various sizes. For example, lunch boxes and tool boxes are common cargo in truck bedliners. The cargo containment region may be sized slightly larger than the base of a standard lunch box or tool box to maximize containment and minimize slippage.

While the cargo containment region may be rectangular to accommodate a lunch box or toolbox, other shapes are also possible.

The cargo containment regions are positioned in each corner of the bed. Corner location of the cargo containment region avoids interference with cargo loading over the broad center portion of the bed and maximizes the remaining available space for storage of large cargo. In addition, corner positioning of the cargo containment region facilitates cargo removal, as the bedliner comer portions are easily reached by a person standing alongside the truck.

The bedliner may be formed with a central square or rectangular reduced height rib region 100, as shown in FIGS. 1 and 2, which may be cut away by the consumer for the installation of a gooseneck hitch ball. The reduced height ribs in this section 100 provide an advantageous position for attaching the gooseneck hitch ball, or facilitate cutting of the bedliner if desired.

A consideration of the forces applied to cargo within a truck bedliner will indicate the optimal positioning of the cargo containment regions 52. Vertical forces as a result of road unevenness and general vehicle vibration may tend to drive the cargo upwardly, however, these forces are counteracted by gravity and without a horizontal component will return the cargo to its original position. The major forces in the plane of the truck bed will be acceleration and deceleration forces from applying the gas or the brakes respectively. Applying the gas will tend to drive the cargo rearwardly, while applying the brakes will tend to drive the cargo toward the front of the bedliner. In addition, the cargo will be accelerated when the vehicle turns. The turning acceleration will have rearward and sideward components.

To prevent possible impact and penetration of the bedliner front wall, it is preferable that the cargo containment regions 52 which are positioned in the front of the bedliner be spaced up to several inches rearwardly from the bedliner front wall. In this way each cargo containment region 52 has a frontward ridge and a rearward ridge defined by normal height ribs. The frontward ridge will absorb the impact of vehicle deceleration, reducing the possibility that the cargo might puncture or crack the upwardly extending front wall. With the generally lower forces expected directly sidewardly, it is acceptable to employ the side walls of the bedliner as one of the perimeter walls of the cargo containment regions 52.

To increase the restraint of the cargo 50 within the cargo containment regions, the entire bedliner surface may be covered with a slip-resistant surface, either by thermoforming the bedliner from a multilayer plastic sheet, or by applying a high friction surface after the bedliner is formed. The bedliner may be formed to have slip resistant surfaces on both sides, as disclosed in Application Ser. No. 09/144,663, entitled Bedliner With Anti-Slip Under Layer, filed Sep. 1, 1998, and incorporated by reference herein.

It is understood that the invention is not limited to the particular construction and arrangement of parts herein illustrated and described, but embraces such modified forms thereof as come within the scope of the following claims.

We claim:

1. A thermoformed thermoplastic truck bedliner for mounting within a vehicle cargo bed, the bedliner comprising:

a bottom wall;

two spaced side walls extending upwardly from the bottom wall;

a front wall extending upwardly from the bottom wall between the two side walls;

portions of the a bottom wall defining a plurality of longitudinally extending ribs, wherein portions of the ribs extend upwardly to a first height to define reduced height ribs, and portions of the ribs extend upwardly to a second height which is greater than the first height to define normal height ribs, wherein the reduced height ribs are positioned adjacent one another to define a cargo containment region, and wherein the normal height ribs transition to the reduced height ribs at downwardly extending steps, the steps being aligned to define a ridge extending across the ribs, wherein a ridge is positioned forward of and rearward of each cargo containment region to thereby restrain cargo on the reduced height ribs.

2. The bedliner of claim 1 further wherein a boundary rib extends in the front to rear direction alongside the cargo containment region, and wherein the boundary rib has an upwardly protruding rib portion which extends above the second height to define a structure which restrains displacement of cargo from within the cargo containment region.

3. The bedliner of claim 1 wherein the normal height ribs are approximately twice the height of the reduced height ribs.

4. The bedliner of claim 1 wherein the reduced height ribs which define the cargo containment region are substantially parallel and extend alongside one of the bedliner side walls without any intervening normal height ribs, such that said sidewall defines one boundary to the cargo containment region.

5. A thermoformed thermoplastic truck bedliner for receiving and constraining cargo to a cargo containment region, the bedliner comprising:

a bottom wall;

side walls extending upwardly from the bottom wall;

a front wall;

portions of the bottom wall which extend upwardly to define a plurality of generally parallel ribs extending rearwardly from the front wall;

portions of a group of parallel ribs which extend upwardly a first height to define reduced height ribs, and wherein other portions of each of the ribs within the group extend upwardly a second height which is greater than the first height to define normal height ribs extending above the reduced height ribs, wherein a step is defined on each rib of the group where the rib changes in height, and wherein a plurality of steps positioned on a front edge of the reduced height ribs define a front ridge, and a plurality of steps positioned on a rear edge of the reduced height ribs define a rear ridge, and wherein a load containment region is defined on the ribs of the group between the rear ridge and the front ridge.

6. The bedliner of claim 5 wherein a boundary rib extends in the front to rear direction alongside the cargo containment region, and wherein the boundary rib has an upwardly protruding rib portion which extends above the second height to define a structure which restrains displacement of cargo from within the cargo containment region.

7. The bedliner of claim 5 wherein the normal height ribs are approximately twice the height of the reduced height ribs.

8. The bedliner of claim 5 wherein the reduced height ribs which define the cargo containment region are substantially parallel and extend alongside one of the bedliner side walls without any intervening normal height ribs, such that said sidewall defines one boundary to the cargo containment region.

9. A thermoformed thermoplastic truck bedliner for mounting within a vehicle cargo bed, the bedliner comprising:

a bottom wall;

a front wall extending upwardly from the bottom wall;

a side wall extending upwardly from the bottom wall adjacent the front wall; and portions of the bottom wall which define a plurality of parallel first ribs which protrude from the bottom wall and which extend generally parallel to the side wall, wherein each first rib has a normal height portion which joins a reduced height portion at a first step, the reduced height portion extending vertically a distance less than the normal height portion, and wherein each reduced height portion joins another normal height portion at a second step which is spaced frontwardly from the first step, wherein the first steps of all the plurality of first ribs define a rear ridge, and the second steps define a front ridge, and wherein a cargo containment region of the bedliner bottom wall is defined between the rear ridge and the front ridge on the reduced height portions, wherein cargo positioned on the cargo containment region is restricted in its movement in the front to back direction by the front ridge and the rear ridge.

10. The bedliner of claim 9 further wherein portions of the bottom wall define a second rib which extends parallel to the plurality of first ribs, the second rib having portions which extend to the same height as the normal height portions, and portions which extend above the height of the normal height portions, to thereby restrict cargo positioned within the cargo containment region from sideward displacement.

11. The bedliner of claim 9 wherein the normal height portions are approximately twice the height of the reduced height portions.

12. The bedliner of claim 9 wherein the reduced height portions within the cargo containment region extend alongside one of the bedliner side walls without any intervening normal height portions, such that said sidewall defines one boundary to the cargo containment region.

13. A truck bedliner and restrained container for mounting within a truck bed comprising:

a thermoformed thermoplastic bedliner having a bottom wall and two spaced side walls which extend upwardly from the bottom wall, and a front wall which extends upwardly from the bottom wall between the two side walls, wherein portions of the bottom wall define a plurality of longitudinally extending ribs, wherein portions of the ribs extend upwardly to a first height to define reduced height ribs, and portions of the ribs extend upwardly to a second height which is greater than the first height to define normal height ribs, wherein the reduced height ribs are positioned adjacent one another to define a cargo containment region, and wherein the normal height ribs transition to the reduced height ribs at downwardly extending steps, the steps being aligned to define a ridge extending across the ribs, wherein a ridge is positioned forward of and rearward of each cargo containment region to thereby restrain cargo on the reduced height ribs; and a container disposed on the reduced height ribs, wherein the container is retained within the cargo containment region, and has upwardly extending walls which engage with one of the first ridge, the second ridge, the side wall or the elevated height protrusion when the container is shifted within the cargo containment region.

14. The bedliner of claim 13 further wherein a boundary rib extends in the front to rear direction alongside the cargo containment region, and wherein the boundary rib has an upwardly protruding rib portion which extends above the second height to define a structure which restrains displacement of cargo from within the cargo containment region.

15. The bedliner of claim 13 wherein the normal height ribs are approximately twice the height of the reduced height ribs.

16. The bedliner of claim 13 wherein the reduced height ribs which define the cargo containment region are substantially parallel and extend alongside one of the bedliner side walls without any intervening normal height ribs, such that said sidewall defines one boundary to the cargo containment region.

* * * * *